(12) United States Patent
Hansen (10) Patent No.: US 12,250,385 B2
(45) Date of Patent: Mar. 11, 2025

(54) FOVEATED PARTIAL IMAGE COMPRESSION USING AUTOMATICALLY DETECTED LANDMARKS

(71) Applicant: Vertigo.ai ApS, Ryomgård (DK)

(72) Inventor: Jacob Gorm Hansen, Ryomgård (DK)

(73) Assignee: Vertigo.ai ApS, Ryomgård (DK)

( * ) Notice: Subject to any disclaimer, the term of this patent is extended or adjusted under 35 U.S.C. 154(b) by 308 days.

(21) Appl. No.: 18/078,179

(22) Filed: Dec. 9, 2022

(65) Prior Publication Data

US 2023/0188731 A1  Jun. 15, 2023

Related U.S. Application Data

(60) Provisional application No. 63/288,955, filed on Dec. 13, 2021.

(51) Int. Cl.
| | |
|---|---|
| *H04N 19/167* | (2014.01) |
| *G06T 3/4046* | (2024.01) |
| *G06T 3/4084* | (2024.01) |
| *G06T 7/246* | (2017.01) |
| *G06T 7/73* | (2017.01) |
| *H04N 19/105* | (2014.01) |
| *H04N 19/12* | (2014.01) |
| *H04N 19/132* | (2014.01) |

(Continued)

(52) U.S. Cl.
CPC ......... *H04N 19/167* (2014.11); *G06T 3/4046* (2013.01); *G06T 3/4084* (2013.01); *G06T 7/248* (2017.01); *G06T 7/74* (2017.01); *H04N 19/105* (2014.11); *H04N 19/12* (2014.11); *H04N 19/132* (2014.11); *H04N 19/172* (2014.11); *H04N 19/42* (2014.11); *H04N 19/60* (2014.11); *H04N 19/85* (2014.11); *G06T 2207/10016* (2013.01); *G06T 2207/30201* (2013.01)

(58) Field of Classification Search
CPC .... H04N 19/105; H04N 19/12; H04N 19/132; H04N 19/167; H04N 19/172; H04N 19/42; H04N 19/60; H04N 19/85; G06T 77/248; G06T 77/74; G06T 3/4046; G06T 3/4084; G06T 2207/10016; G06T 2207/30201

See application file for complete search history.

(56) References Cited

U.S. PATENT DOCUMENTS

2014/0003662 A1* 1/2014 Wang ................... H04N 19/167
                                                           382/103
2019/0332883 A1* 10/2019 Ivanovic .................. G06T 9/00

(Continued)

*Primary Examiner* — Jeremiah C Hallenbeck-Huber
(74) *Attorney, Agent, or Firm* — Jeffrey Pearce (57) ABSTRACT

According to an image transmission method, a pre-processed image is inputted into a compression system, which automatically localizes at least one primary feature in the pre-processed image and then automatically determines a position within the pre-processed image of at least one landmark corresponding to the at least one primary feature. It then automatically foveates the pre-processed image to emphasize portions of the pre-processed image within a pre-determined measure of closeness to the landmark(s) and transmits the foveated image to at least one recipient system, which reconstructs a received version of the pre-processed image by inverse foveation. In one embodiment, an incompressible fluid mechanics model is used to determine the degree of foveation at different points in the pre-processed image.

10 Claims, 6 Drawing Sheets

(51) Int. Cl.
  *H04N 19/172* (2014.01)
  *H04N 19/42* (2014.01)
  *H04N 19/60* (2014.01)
  *H04N 19/85* (2014.01)

(56) References Cited

U.S. PATENT DOCUMENTS

2020/0358983 A1* 11/2020 Astarabadi ............. H04N 7/157
2021/0034836 A1*  2/2021 Haimovitch-Yogev ......................
                                                G06N 3/04
2021/0397861 A1* 12/2021 Elrasad ................... G06V 20/52
2022/0122308 A1*  4/2022 Kalarot ..................... G06T 3/02
2022/0198459 A1*  6/2022 Nazarkin ............. G06Q 20/204
2022/0217371 A1*  7/2022 Jiang ....................... G06N 3/045
2022/0375024 A1* 11/2022 Luo ........................... G06N 3/08

* cited by examiner

FOVEATED PARTIAL IMAGE COMPRESSION USING AUTOMATICALLY DETECTED LANDMARKS

CROSS-REFERENCE TO RELATED APPLICATIONS

This application claims priority of U.S. Provisional Patent Application No. 63/288,955, filed 13 Dec. 2021.

BACKGROUND ART

Face-to-face video communication systems use digital cameras to capture participants' faces and a standard video codec such as H.264 or H.265 to compress the digital images for transmission over a network. To save bandwidth, network protocols typically use key-frames and delta-frames, where key-frames are compressed images similar to JPEGs, and delta-frames capture the relative changes between two frames. If the person, or persons, in front of the camera is sitting still in front of a still background without any camera sensor noise, the use of delta-frames typically results in bandwidth savings. However, if the person or background IS moving, or there is a lot of sensor noise, for example, due to a low-quality camera sensor or lack of ambient light, the savings from delta frames may be limited. The bandwidth is used equally across the frame, which means that the parts of the image most important to conversation, determined in eye-tracking experiments to be the eyes and the mouth, do not receive preferential treatment compared with, say, the speaker's clothing or a bookshelf in the background. This leads to both a waste of overall video bandwidth, because unimportant areas of the image are transmitted in too high detail, and an unnecessarily poor reproduction of the speaker's face at the receiving end, because too little bandwidth gets allocated to the areas of the speaker's face that are most important to the conversation.

DESCRIPTION OF EMBODIMENTS

The invention provides various embodiments that reduce the bandwidth demand for image transmission of image portions of greatest communicative relevance or, alternatively, enable higher relative resolution for such image portions for a given available bandwidth. The improvement in transmission will in most cases be available even for real-time video transmissions, but may also be used to transmit static and even pre-stored images. Because it is anticipated to be the most common use for the invention, embodiments are described below in terms of identification and enhanced transmission of faces. This is just by way of example, however; the invention may be used to selectively isolate and relatively enhance any identifiable feature in or portion of an image.

According to the invention, a video compression system 200 (see FIG. 5) takes as input raw video frames from a camera or a video file. Using an AI algorithm, for example based on convolutional neural networks, or neural transformers, such as Yolo (see "SSD: Single Shot MultiBox Detector": Wei Liu, et al., University of North Carolina) and SSD (see "You Only Look Once: Unified, Real-Time Object Detection", Joseph Redmon, et al., University of Washington) the system can locate heads and/or faces and landmarks in the faces in each video frame. The landmarks may either be discovered with the same AI algorithm that discovers the faces, or discovered in a separate pass.

The system designer may train the AI algorithm to work with different image features as specified landmarks. In general, these will be any portions of the image that show relatively easily recognizable geometry, such as points, lines, closed curves, etc. Point-landmarks could be, for example, the corners of the mouth, tip of the nose or chin, the pupils of the eyes, etc. Linear landmarks might be, for example, the line of the mouth, the upper frame of eyeglasses, etc. Closed curve landmarks might be the eyes, the lenses of eyeglasses, etc.

The method for localizing heads or faces is preferably automatic such as a machine learning routine like a neural network, for example, employing a deep learning (a neural network with multiple layers) system using convolutions in some or most of the layers, although other neural network configurations may also be used. Landmarks may be computed as a by-product of localization, or there may be an individual step involved where heads/faces (or other primary features) are first cropped from the input image before landmarks get located by a separate neural network. The advantage of the former approach is speed and simplicity, whereas the two-step approach may provide for improved precision. In general, landmarks will correspond to distinctive geometric characteristics of or relating to the primary image feature that enable rectification, that is, alignment, suitable for recognition.

In some variations of the method, a face-recognition algorithm is used to filter away unwanted faces, for instance, bystanders in a café or co-working space, to exclude them from video compression and transmissions. In the case of filtering away faces, the system may be configured either manually, with a positive list of face vectors to compare against, or learn the face vector of the current user at the beginning of the video conversation. Comparison may then be done by computing a difference in vector space between the configured positive vectors, using a method such as Euclidian distance, dot product similarity, Hamming distance, list decoding, etc.

Alternatively, the faces of bystanders may be compressed and sent separately, optionally causing each individual to show up in a separate window on the recipient's screen.

In other variations of the method, the face landmarks are used to rectify the face images along an axis of at least approximate symmetry, such as the vertical axis. This may be done by computing a rigid transform between the actual landmarks located in the image, and an ideal set of landmarks of a vertically aligned face. In other variations the input image may be left as-is or cropped around the head or face rectangle, without realignment or rotation.

"Foveation" as such is a known concept. The term itself derives from the "fovea centralis", the central region of the macula of the eye's retina, where visual acuity is maximum. The term "foveation" has been adopted in the area of image processing as well, but prior art systems also generally rely precisely on identifying a user's fovea to perform any kind of image processing. To accomplish this, such systems typically require devices such as an eye tracker to identify which portion of a image or field is being viewed by the user and lies within the user's point of focus (being viewed by his fovea). The rendered resolution of areas determined to lie in the user's peripheral vision (outside of the zone gazed at by the fovea) may then be reduced.

As will be made clear below, "foveation" in this invention takes a different approach in that it does not require any such specialized device, but rather may be used with devices that a user will typically already have, such as a smart phone, tablet or laptop computer, etc. The invention does not require any detection of the point of focus of the user sending the images, for example, using an eye tracker. Thus, as used here, "foveation" is the selective relative enhancement of regions of greatest assumed relevant image information based on automatically determined image landmarks in the image itself.

The areas close to these landmarks may be regarded as being of higher importance than the areas farther away, so more bandwidth should be used to preserve them during transmission. Note that bandwidth availability could even be determined "dynamically", before image cropping and foveation, for example, by first running a known network speed test before a video session. "Closeness" may be implemented as a proximity function, defined in any way the system designer prefers, and may depend on the available bandwidth, since greater available bandwidth may not require as much foveation as relatively less bandwidth. "Close" could, for example, be defined as being within a number of pixels from the landmark, or a percentage of some linear distance (such as horizontal or vertical) of the video frame, such that the proximity function generates a greater distance between adject pixel the closer to the landmark of interest they lie. "Closeness" could also be defined according to a visual property of the image, such as any region contiguous with the landmark in which the brightness, color parameters, etc., are within a predetermined measure of similarity of the landmark; the proximity function would in such cases be defined accordingly.

The bandwidth may be preserved using a number of methods, including, but not limited, to the following:

Selectively enlarging portions of the image by increasing the spatial sampling rate (degree of granularity) around the landmarks of interest, in a way that the enlargement operation can be made reversible, to restore the image to its original proportions. One such method, described in greater detail below, can be implemented by computing a vector field with a pressure map that causes parts of the image to be over-sampled and other parts to be under-sampled, and an inverse vector field that acts as an inverse, for instance by the use of inverted pressure map weights. This method has the advantage of resulting in an overall reduction in image dimensions, typically by a factor of 2 in each of width and height, which will reduce both subsequent image processing latency and network bandwidth requirements by a factor of 4, albeit at the cost of needing a compatible reversing image decoder at the receiving end.

Compressing the important areas of the image using higher quality settings. For instance, where the HEVC video format is used, the known Discrete Cosine Transform and Discrete Sine Transforms may be applied to convert image tiles to sparse vectors that are more amenable to quantization, which is the assignment of a given input vector to the nearest in a set of pre-defined or pre-communicated vectors, similar to how an RGB-image may be converted to palletized image with fewer colors. Similarly known compression techniques may be applied where other video formats are used. Larger 8×8 tiles with more aggressive quantization results in higher compression rates, but poorer image quality, whereas smaller 4×4 tiles with less aggressive quantization result in higher image quality. Heuristics and user-defined preferences may be applied to decide which settings to apply to what parts of the image, but this may also be automated with the use of AI-derived landmarks. One advantage of using AI-derived landmarks is it allows for the use of existing video decoders on the receiving end, while still optimizing video bandwidth and quality.

The compressed signal may be further enhanced on both the sending and receiving ends, using signal processing or AI image enhancement techniques. For instance, background matting may be applied to the signal, leaving only the user's head and face visible, and for image enhancement, known noise-reduction methods may be used. On the receiving end, the signal may be up-sampled to a higher resolution than was transmitted, for instance through the use of AI image upscaling techniques.

This invention uses artificial intelligence (especially, neural networks or other machine-learning techniques) to locate the important landmarks in the speaker's face (or other primary feature), automatically and in real time, and modifies and preferably crops (as needed) the image to remove unimportant background details and to boost the most important areas, typically, but not limited to, the speaker's eyes and mouth. One prototype embodiment used a single deep convolutional neural network to detect and locate heads, faces, and five landmarks (eyes, nose, corners of the mouth). The neural network was trained to maximize the Intersection-over-Union between a set of proposed bounding boxes covering human heads and faces and the set of manually annotated bounding boxes in a large set of training images. Within each face bounding box, the neural network is trained to minimize the distances between the proposed face landmarks and those of manually annotated training images. In the case of multiple detected bounding boxes overlapping, these are merged via arithmetic averaging, as this makes the detections more precise and stable against statistical noise over time when the input is live video. The landmarks may also be subject to averaging when multiple face detection boxes overlap, and furthermore optionally subjected to Kalman Filtering to remove statistical noise.

The invention may be used in combination with a digital camera, such as the one installed in most laptops, tablets, and smart phones, but it may also operate with images that have been pre-captured or created using any method and pre-stored. The invention is implemented as software that may run directly at the device connected to the camera, or on a server processing the video stream coming from a network-connected camera or device. The invention may use a standard artificial intelligence image processing algorithm, such as a deep convolutional neural network to localize faces in the image, performs real-time face recognition to identify each speaker, and then transmits a foveated and highly compressed image to one or more receivers across the network.

Figure 1:
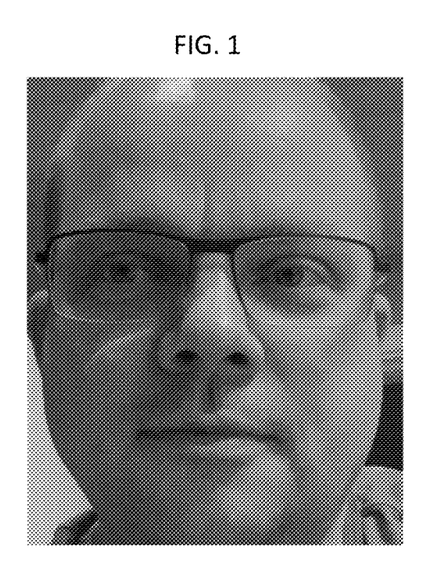
FIGS. 1, 2, and 3 show, respectively a cropped and aligned original image used in an experiment of an embodiment of the invention, the same image resized while foveating around eyes and mouth landmarks, and the image restored after compression and transmission.
Figure 2:
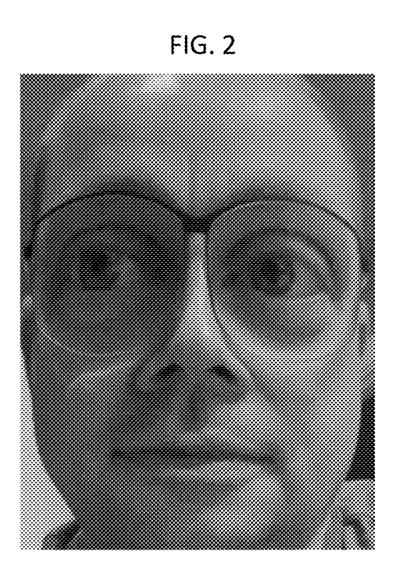
Figure 3:
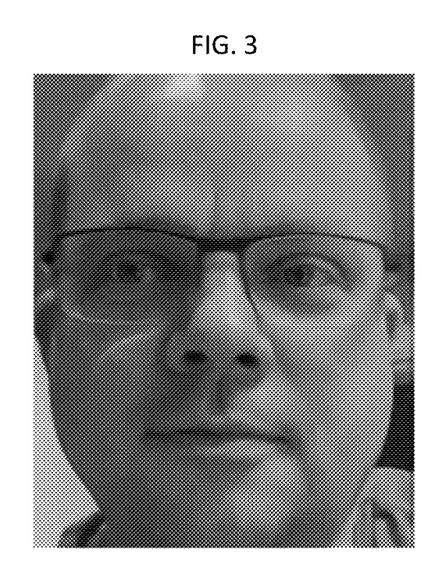
Figure 4:
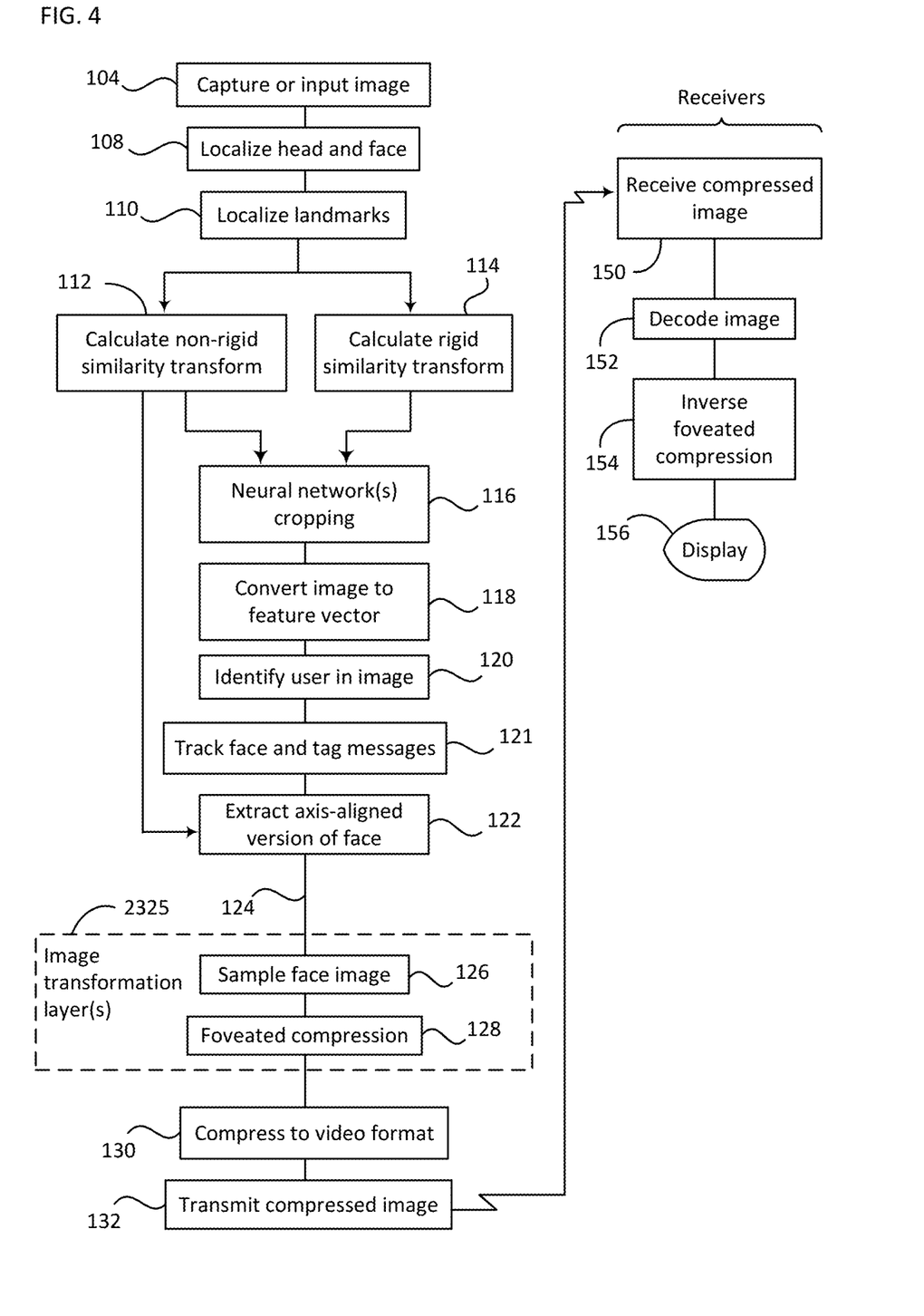
FIG. 4 is a flowchart that outlines the steps involved in creating, transmitting, and rendering an image processed according to an embodiment of the invention.
Figure 5:
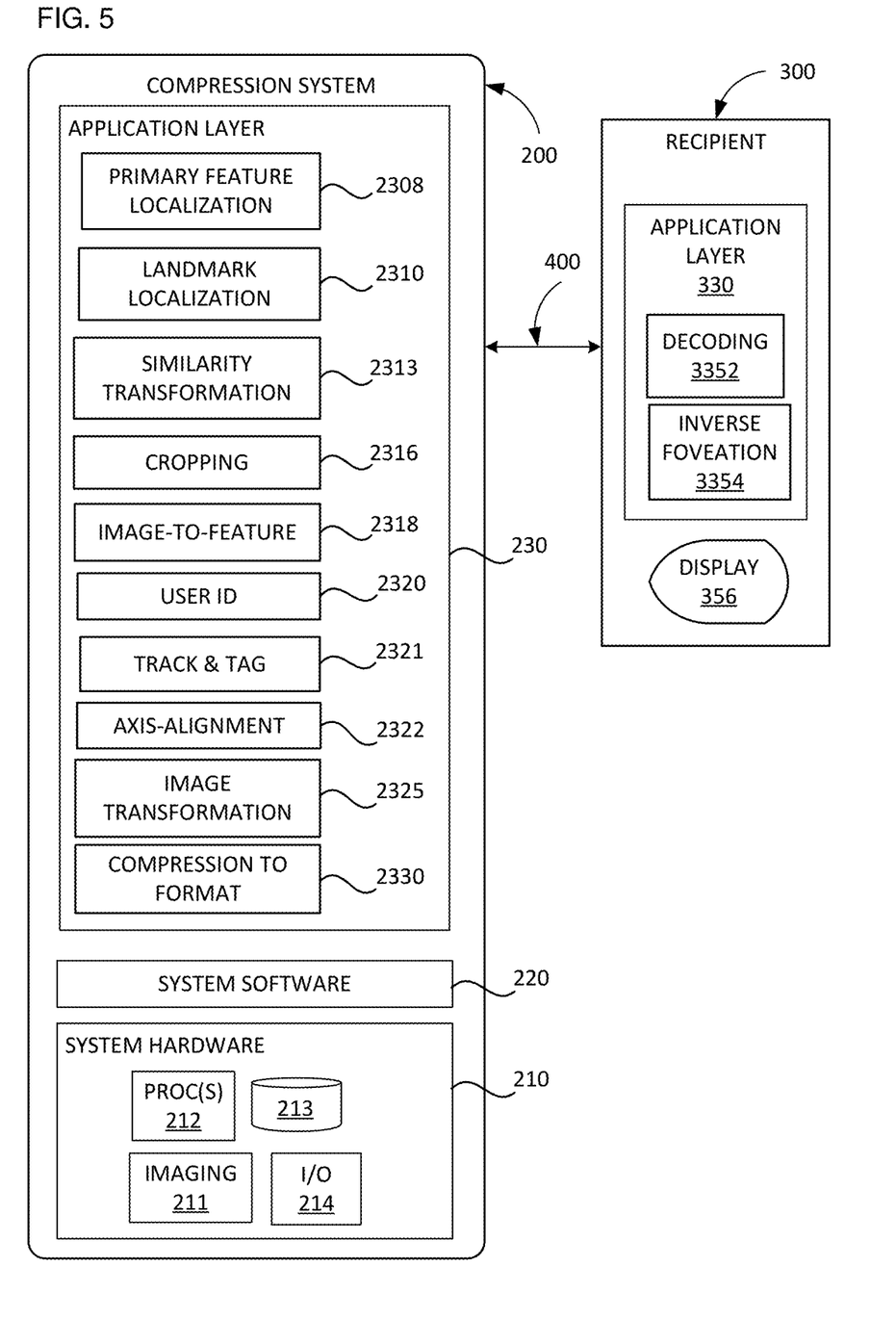
FIG. 5 shows the main hardware and software components of a compression system and one receiver configured according to an embodiment of the invention.

FIGS. 1-3 illustrate an example of pre-processed (FIG. 1) and reconstructed images (FIG. 3), as well of an intermediate, foveated image (FIG. 2) that is transmitted to and receiver by the end user, that is, recipient. (Note that neither the sender nor the recipient will usually see this "distorted", foveated image; it is shown in FIG. 2 merely to illustrate the effect of the type of foveation applied by this invention. FIG. 4 is a flowchart that shows an example of the routines the software applies to accomplish this, proceeding according to the following steps, and FIG. 5 depicts corresponding software modules that may be included in the compression system 200 and a receiver/recipient 300 to carry out those steps.

After capturing or inputting an image (Step 104), localize the primary feature(s) (Step 108, module 2308) in the image, that is, the features that are to be transmitted with the best possible fidelity. In the cases where the image (that is, each of the frames of a video) includes a user's face, this primary feature will typically be the user's head and face. In other videos, other features may be primary, such as a vehicle, the user's whole body, etc.

Determine the position of "landmarks" (Step 110, module 2310) such as the eyes, nose, and corners of the mouth.

From the landmarks, calculate two image transforms: one non-rigid similarity transform (Step 112), used for face recognition, and one rigid transform (Step 114) (shown as combined in module 2313) for aligning the image within the frame to be transmitted. As is known, a "rigid transform" is an isometric transformation that preserves length, that is, the Euclidean distance between any two pairs of points. A rigid transform will therefore comprise any combination of one or more of the operations reflection, translation, and rotation.

Solve the rigid similarity transform iteratively using, for example, the conjugate gradient method, whereas the non-rigid transform may typically be solved analytically.

Once the transformations needed to transform the actual image of the face to align it with the ideal vertically aligned face are known, pass the image to one or more neural networks that may use them to crop images (Step 116, module 2316) from the high-resolution input image. Cropping may be advantageous particularly where images are to be presented on relatively small-screen devices, or where the available bandwidth for transmission is particularly small, but may be omitted in other cases.

Convert the face image (for example) to a "feature vector" (Step 118, module 2318) describing the user's face. This feature vector will typically be a high-dimensional array of numbers (binary, integer, or floating point) that has the property that some distance calculation can be performed between two feature vectors, such that vectors derived from images of the same person yield a high measure of similarity, which, depending on the distance function in use, can be expressed as either a high or low score, which can be subjected to thresholding. Example distance functions are cosine distance and or Euclidian distance. In the current state of the art, such feature vectors are computed with the help of a deep convolutional neural network, for example as described in: Jiankang Deng, Jia Guo, et. al. *ArcFace: Additive Angular Margin Loss for Deep Face Recognition*, Retrieved Dec. 7, 2022, from https://arxiv.org/abs/1801.07698. For instance, if the distance function in use is normalized dot-product similarity, also known as cosine distance, a similarity score above 0.3 (for example) could be interpreted to mean that the two compared face vectors derive from the same person's face. In the case of binary vectors, where elements can be either zero or one, a suitable distance could be the Hamming or edit distance, where a shorter distance would indicate larger similarity between face vectors.

Using the chosen vector distance function, use this vector to perform a lookup in a local or centralized database of faces, to identify the user in the image (Step 120, module 2320). In the case where the face vector is or can be expressed as an array of binary numbers, this process may be sped up by the use of one or more hash tables to avoid doing an exhaustive search. If no such centralized database has been established, the invention may instead proceed from a local database configured with the currently active users' faces. The face recognition step may also be excluded entirely, and instead—possibly with reduced precision—identification may rely on temporal tracking of each user's face or head detection box across video frames. This tracking can be done by attempting to maximize the overlap of boxes from frame to frame, or using some other method of correlating pixel contents, e.g., using a method similar to the one proposed in, for example, Yifu Zhang, et al., "ByteTrack: Multi-Object Tracking by Associating Every Detection Box", Huazhong University of Science and Technology. Again, as mentioned above, note that faces are just one image feature that the invention could be used to identify. In general, the invention may be used on any image that contains an identifiable feature that is to be emphasized as opposed to others and/or a background that is to be de-emphasized.

Use the resolved user identity to track the user's face across frames (Step 121, module 2321) for the purpose of correctly assigning the face to the relevant video stream, in the case of multiple participants sharing a camera, or for the purpose of including just a single participant, while filtering away bystanders who should not be allowed to join the video call, and (optionally) tag network messages with the user id and feature vector to allow remote parties to label the user visually.

The system may optionally filter the faces against a pre-configured positive list, so that only those of registered users are transmitted across the network, to protect the privacy of bystanders.

Once the system has identified the user in the image, apply the non-rigid transform to extract an axis-aligned high-resolution version of the user's face (Step 122, module 2322).

Pass (Step 124) the rectified image to one or more image transformation layers (module 2325) of the neural network, which sample the face image (Step 126) from the full video frame subject to the computed image transformation, and perform the foveated compression (Step 128), reducing the image resolution in both directions.

Compress the foveated image to a video format (Step 130, module 2330) such as H264 or H265, AV1, or any other video or image compression format that is suitable for network transmission. The image can be sent either independently (as a "key frame") or as a differential "delta" update relative to other images in the stream (a "delta frame").

Finally, transmit the compressed image (Step 132) over the network using any preferred encrypted or unencrypted protocol. The image may also be transmitted in combination with audio if audio has also been captured in parallel or otherwise.

The compressed image is received at other endpoints (Step 150), that is, one or more receivers 300, either as a dependency-free key-frame or as a delta-frame over a previous key-frame. Each receiver then processes the compressed, transmitted image, according to the following general steps:

Decode the image (Step 152, module 3352) using the video codec's decoder stage.

Pass the decoded image to a module that determines an inverse version of the foveated compression layer (Step 154, module 3354) and outputs the image in its original resolution, for example, for display (Step 156, display 356), reversing as much as possible the foveation step described previously. The image displayed for the end user—the recipient—is thus a "reconstructed" image.

The foveated compression layer works by enlarging the areas of the image that a human typically attends to during a conversation. The enlargement works by computing, either ahead of time or for each frame, a vector field for displacing the input pixels, effectively enlarging more important areas (such as the eyes or mouth) while reducing the relative sizes of the rest of the image. This displacement is preferably "smooth" or "seamless", that is, with gradually decreasing displacement, for example, linearly decreasing displacement from a maximum at the landmark to a minimum at some predetermined distance (measured linearly or by pixels, for example), away. This avoids noticeable lines of transition and other image artifacts, which typically occur when using prior art systems that "segment" an image into pre-determined, often rectangular, processing regions.

Instead of determining the importance (or "visual acuity") of each pixel to be transmitted from just a discrete set of levels (typically as belonging to an acute vs non-acute region), embodiments may instead determine this from a continuous scale that is calculated based on the distance from a given landmark (such as the left eye) and an importance weight assigned to this landmark (where, for instance, the eyes may be assigned a larger importance weight that the mouth).

Figure 6:
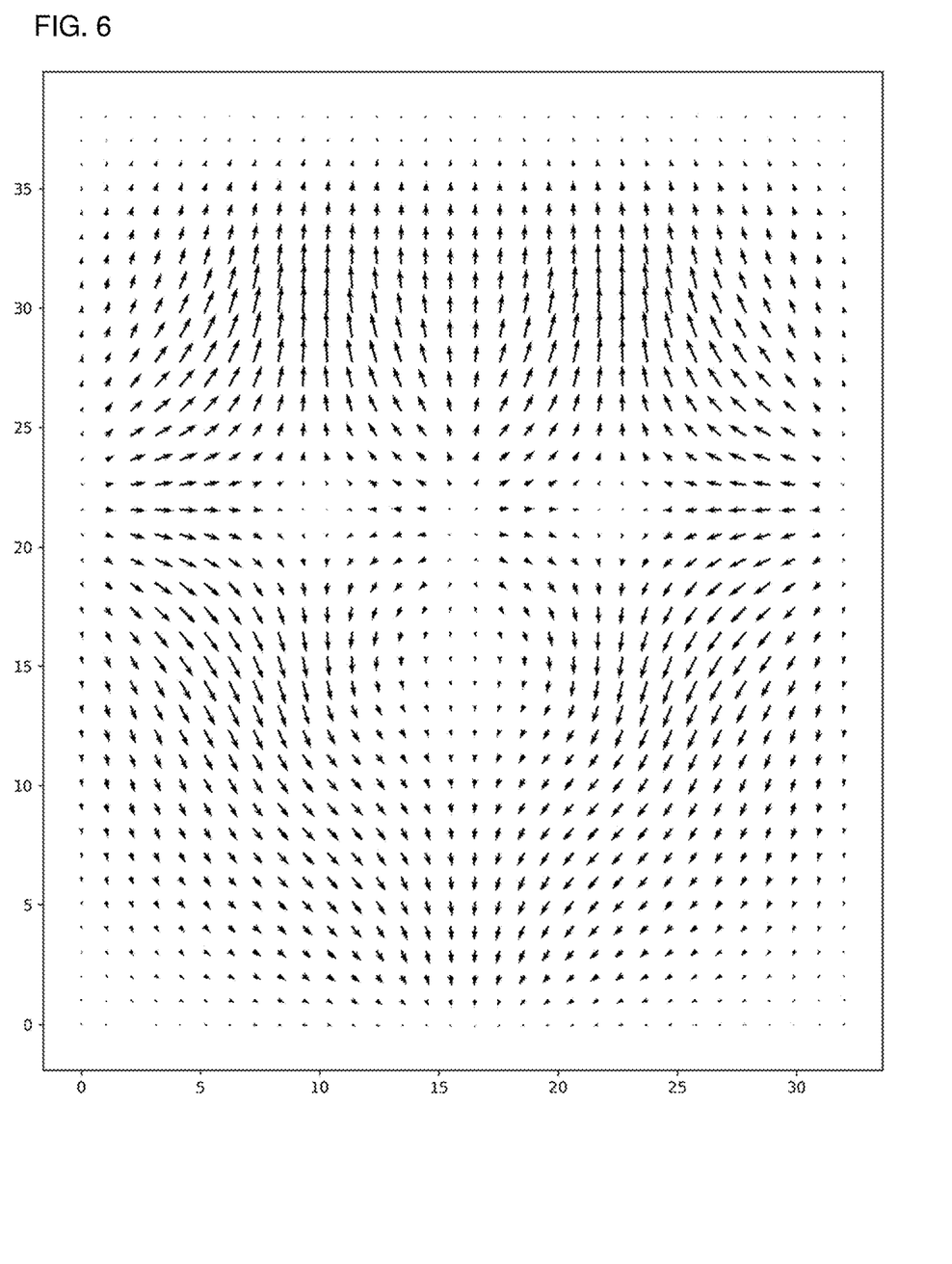
FIGS. 6 and 7 depict an example of a warped (contracted) and de-warped (expanded) vector field that represents the compression technique used in one embodiment of the invention.

Based on the calculated importance, this embodiment varies the image spatial sampling rate, such that pixels that are closer to important landmarks are sampled at finer spatial granularity than pixels farther away from important landmarks. FIG. 6 shows an example contraction vector field used to displace image pixels from a higher resolution input image to a lower resolution output image, with the output image dimensions being 32×38 pixels (artificially low image resolution used for readability, typical image dimensions in a production system will be 10-20 times higher.) As a vector field, note that each point in FIGS. 6 and 7 represents a vector and, as such, encodes both a displacement distance (magnitude) and direction, which, in Cartesian coordinates, can be represented as ($\delta xi$, $\delta yi$) for position xi, yi in the field.

Figure 7:
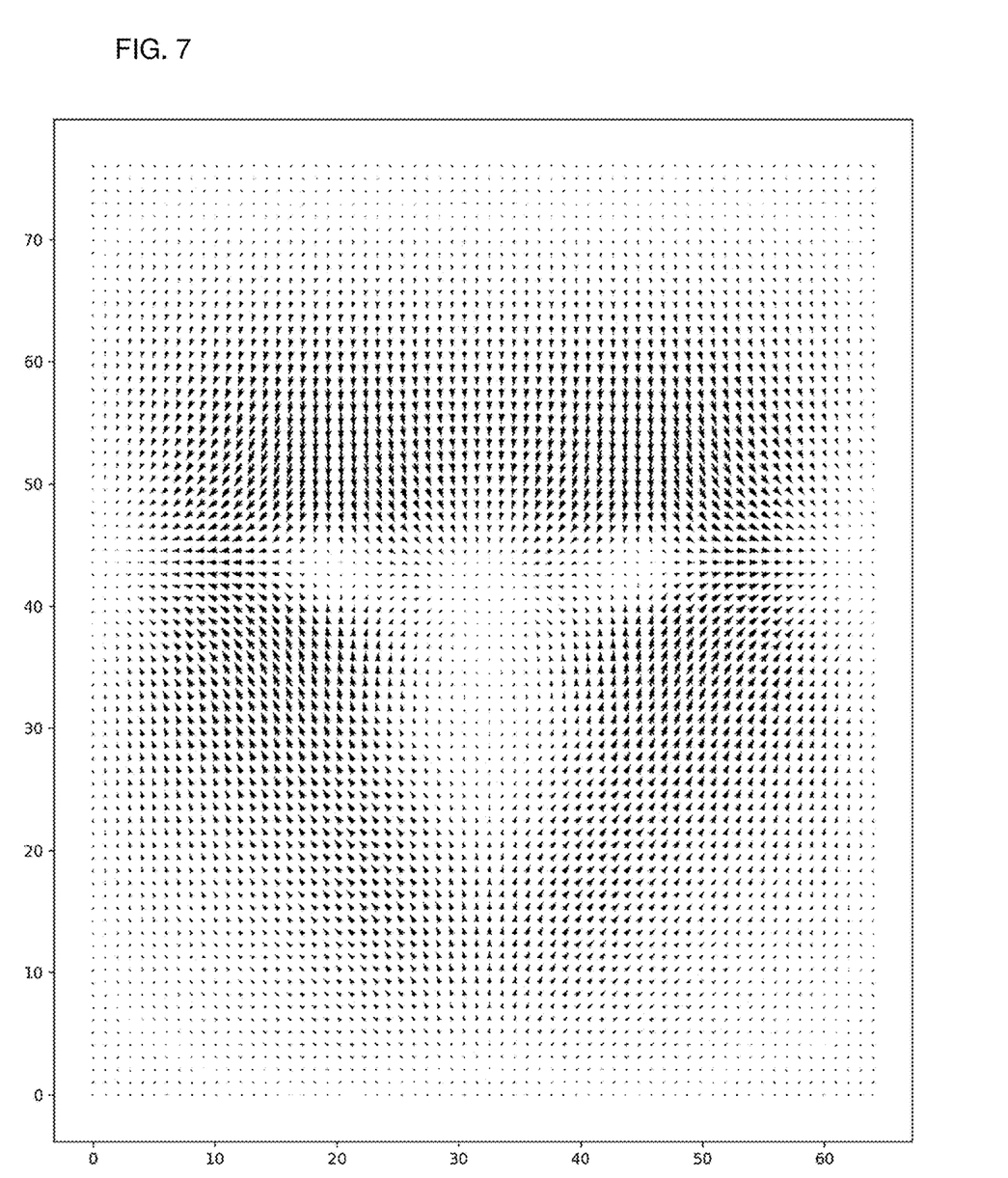

FIG. 7 shows an example expansion vector field used for restoring the reduced size image to its original dimensions. The lengths of the arrows indicate the distance travelled by each output image pixel from its original location in the input image, and the direction of the arrow indicates its direction of travel. For a given x1,y1 coordinate in the output image, the corresponding input x2,y2 coordinate may be resolved as $x2=x1+\delta x1$, $y2=y1+\delta y1$, where $\delta x1$, $\delta y1$ are the coordinates at position x1,y1 in the vector field. If the resulting coordinate is non-integral, some form of interpolation, such as bi-linear or bi-cubic interpolation may be used to improve the accuracy of the result.

In FIG. 6, as well as FIG. 7, the axes are the x- and y-axes, respectively, of the output images. In FIG. 6, the input image is shown having been reduced from 64×76 to 32×38 pixels, so that the areas around the eyes and the mouth are sampled at higher spatial resolution, approaching or reaching the original input resolution, compared to the pixels in the periphery of the input image, that are under-sampled compared to the input image. FIG. 7 shows an example displacement vector field used for restoring the variably sampled 32×38 pixel image to its original 64×76 dimension, by under-sampling the previously over-sampled areas.

Embodiments thus implement an analogy to fluid flow, that is, pixels may be thought of a "flowing" with a distance/magnitude and direction (thus, a vector) from their "raw" positions in an image frame to positions that form the basis of the images to be transmitted. The flow vector field can be computed in various ways, subject to the requirement that an invertible flow exists and can be computed. One method is to treat the pixel displacement vector field as an incompressible flow, which can be solved iteratively using fluid mechanics algorithms and the Navier-Stokes equation. Pressure is initially applied to the cells around each landmark, and the incompressible fluid-flow problem may then be solved iteratively to yield the displacement vector field, which, when used as a forward map between the input and the output images, will cause the image pixels to "flow", that is, be displaced, either toward or away from the pressurized areas.

Continuing with the fluid mechanics analogy, the current embodiment computes an initial "pressure" field, with the pressure in each "cell" (pixel or pixel group) calculated from the inverse distance from the current cell to each of the landmarks, multiplied by per-landmark importance weight. Negative pressure is used in the contracting phase (for image transmission), and positive pressure used in the expanding phase (for image reconstruction). The importance weights may be chosen in any preferred manner by the system designer, depending on one's preferred degree of emphasis of different landmarks. For example, whereas the eyes, nose, and mouth will generally be considered of highest importance, and thus require the greatest importance weight, for video transmissions that include a face, recall that the invention is not limited to just faces, such that other weighting may be more appropriate. In effect, assigning an importance weight to a landmark may be analogized to applying a corresponding pressure in the "fluid" (plane of pixels), with the resultant vector field being computable, for example, using Navier Stokes equation and where "magnitude" corresponds to the degree of granularity with which the region is spatially sampled.

Figure 8:
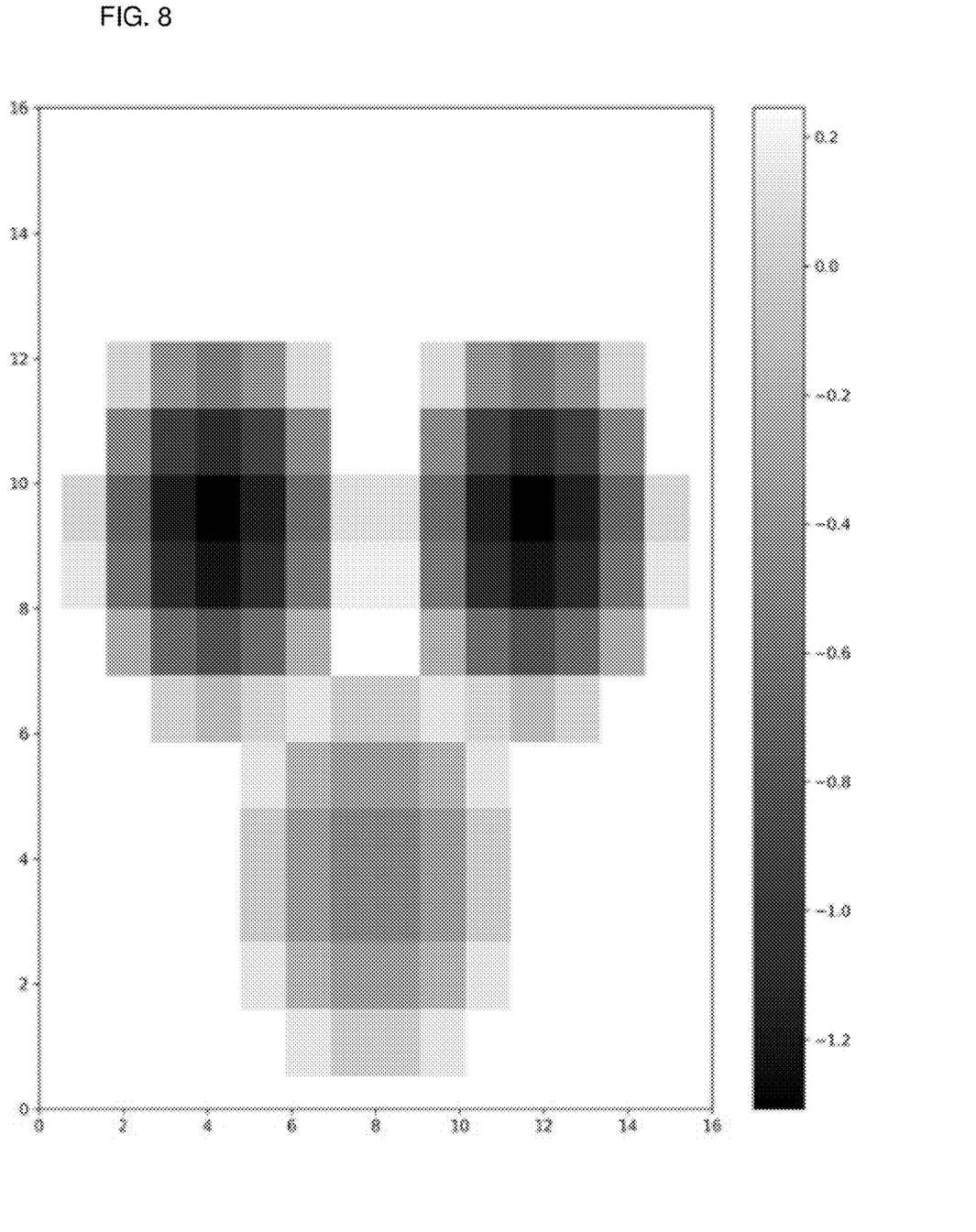
FIG. 8 depicts a "pressure field" map that illustrates a method for determining pixel displacement.

An example of a negative pressure field, with different importance weights of the eyes versus the mouth is shown in FIG. 8. The scale to the right of the main graph illustrates the gray-scale used, with darker shading representing greater "pressure", with higher sampling granularity and less displacement. To turn such a pressure field into a vector field suitable for controlling the warping of an input image, one embodiment uses a pressure-correction computational fluid dynamics method to iteratively turn this pressure field into an incompressible flow without divergence. The pressure-correction method as such is a known class of methods used in computational fluid dynamics to numerically—and typically iteratively—solve the Navier-Stokes equations, in particular for incompressible flows. As this iterative process may be slow for pressure fields of large dimensions, the compression system 200 may be implemented to solve the incompressible flow problem for a smaller pressure field (for example, m×n pixel blocks, such as 16×16 in one prototype), and use linear interpolation to enlarge the mesh to the desired output image dimensions. The advantage of this incompressible flow approach is that the exact inverse flow, which is necessary for restoring the image to its original dimensions, can be calculated simply by changing the sign of the elements of the pressure field. Negative pressures will have the effect of pulling the sampling offsets closer to the landmarks, increasing sampling resolution around the landmarks, and positive pressure will push the sampling offsets away from the landmarks.

The flow field can be computed either ahead of time, with landmarks placed at the locations typically expected, e.g., based on typical human face dimensions, or separately for each image frame, in response to actually detected landmark locations.

The vector field is computed such that the transformation is reversible, shrinking the entire image on the sending side, and restoring the original size on the receiving side. Important areas (for example, the eyes and the mouth) will be preserved in their original, full resolution, whereas areas in the periphery with be subject to some quality degradation.

Experiments run on a prototype of the invention show that the use of foveated video compression allows for high-quality 20 FPS face-to-face conversations over low-bandwidth links down to 0.35 Mbps, where prior art products would fail to negotiate a working video connection at all. This leads to new possibilities for the use of video conferencing, for example, in remote or rural areas, over low-bandwidth protocols such as Bluetooth, or even over satellite links such as those provided by the Inmarsat network.

While foveated image compression has been proposed before, the invention is unique in that it uses AI to locate multiple landmarks from a live video feed and is able to seamlessly foveate around multiple points of interest. This makes it practical for automated use, with many other potential applications such as for news broadcasting and for compression of security video footage. FIG. 1 shows an example of a cropped and aligned face image that has been subjected to foveated compression and restored to full size after transmission. In the example shown this resulted in a 330× data size reduction. FIGS. 1, 2, and 3 show, respectively, a cropped and aligned original image, the image resized while foveating around eyes and mouth landmarks, and the image restored after compression and transmission.

Above, embodiments are described in which heads and/or faces are the image portions of greatest interest and for which resolution and precision are to be emphasized relative to other image portions. This is because heads and/or faces are known to carry the most visual communicative information in most video-based conversations. This is just one example. As long as the image portion type of interest can be identified and extracted for foveation, the invention may be used to improve the relative resolution and precision of any type of image feature of interest. As one example, a system designed may wish to emphasize whole-body images of a person, for example, during a video transmission of a sports event, or child's birthday party, or from a security camera, in which the landmarks used as aids in feature isolation could be hands or arms, knees, the head, etc. The "landmark" could also be "relative motion", for example, of an object such as a vehicle that is moving relative to a background or other objects, in which case the borders of the object can be identified, rectified or not, by either a neural network trained to recognize typical vehicle shapes, or other known methods. These techniques could also be combined. For example, not only the shape of a body but also that it is in motion could be used as criteria for image extraction for foveation.

As FIG. 5 illustrates, the image compression system 200 will typically include a hardware layer 210, including one or more processors 212, system software 220 such as an operating system, as well as some combination of memory and non-volatile storage 213. The system software 220 may include drivers as needed for any I/O devices 214 enabling the compression system to interact with peripheral devices and communicate with other systems, such as one or more recipients 300, over a network 400.

In FIG. 5, an "imaging" component 211 is shown within the compression system 200. In some implementations, this will be a built-in camera, such as when the compression system is part of, for example, a smartphone, laptop computer, tablet, etc. In implementations in which a separate, external system is used to provide images, the component 211 will be a corresponding input unit, which may be incorporated into the I/O component 214. Such an external image-providing system might itself be a camera, but could also be any system that provides a real-time or stored video file to the compression system.

Applications may run on the hardware under the control of the system software; the procedures described below will in general be carried out by software modules or components running at the user/application level and can thus be viewed as "applications" in an "application layer" 230. Such an application layer is usually distinguished from the system software layer 220 in that system software operates in a privileged mode with respect to its interaction with system hardware whereas "applications" don't. In many modern devices, this distinction may not apply. Thus, that the various modules shown in the respective "layers" 220, 230 is for purpose of illustration only. It would, for example, be possible for the user device 200 to be custom-made for a particular use case, with the application-level software components being incorporated into the system software. One of the advantages of embodiments of the invention, however, is that it may be easily installed within devices such as smart phones that most users are likely to have readily available.

Similar hardware and system software components will typically be found in the other processing entities, such as the recipient(s) 300, but are not illustrated separately for the sake of simplicity. The system software, as well as applications, including the specialized modules described below, will be embodied as processor-executable code that is usually embodied in non-volatile storage and is then loaded as needed into memory for execution by the processor(s). The code itself may be pre-loaded, downloaded from an external source, input from a portable storage medium such as a disk, thumb drive, etc. In particular, the several software modules 2308-2330, 3352, 3354 shown in applications layers 230, 330 of the compression system 200 and a receiver 300, respectively, will comprise such processor-executable code. Note that any or all of the modules illustrated separately in FIG. 5 within the compression system 200 and receiver 300, respectively, could be implemented as different routines within a single larger body of code.

Foveated image or video stream compression has been proposed previously, but not in combination with an AI system to locate important landmarks. The proposed methods vary image quality by adjusting compression ratios, whereas this invention implements the foveation by varying spatial resolution, and allows the foveated signal to be transmitted across the network as single video stream, as opposed to multiple streams required in many other known systems. The invention may, moreover, be used independently of the underlying image codec.

The method proposed in U.S. Pat. No. 10,511,842 ("System and method for foveated compression of image frames in a system on a chip"), for example, selects rectangular or hexagonal areas to compress with different quality settings.

This known system foveates only around a single center of focus, and does not support gradual or seamless foveation settings around multiple landmarks as in this invention; moreover, it does not enable automatic landmark detection, for example, using AI techniques.

Other known methods support multiple foveated rectangular regions, and are able to use an existing video codec as transport by coding the image as an image pyramid of multiple resolutions, but, unlike this invention. do not support gradually increasing the image quality around points of interest; this leads to visible artifacts at the boundaries of foveated regions.

The method proposed in U.S. Pat. No. 10,319,114] ("Foveated Compression of Display Streams") decides the region to be foveated as a region of the user's field of view, which cannot always be known unless the user is wearing a VR head-set, or special eye-tracking hardware is used. My invention, in contrast, does not depend on knowing the user's head position or view direction, as the AI algorithm(s) that analyzes the image contents is able to configure the foveation dynamically. My invention is thus more practical in situations where the viewer's head or gaze direction cannot be tracked, such as on smart phones, tablets, laptops, desktop displays and television screens.

Table 1 shows uncompressed and compressed image sizes in bytes that one prototype of the invention was able to achieve at different stages of processing:

TABLE 1

| Image | Shown in FIG. | Image resolution | Uncompressed size, 24-bit color per pixel | Compressed size as PNG format, 24-bit color per pixel |
| --- | --- | --- | --- | --- |
| Original image | FIG. 1 | 512 × 512 | 786,432 bytes | 309,744 bytes |
| After foveation | FIG. 2 | 256 × 256 | 196,608 bytes | 97,710 bytes |
| Restored image | FIG. 3 | 512 × 512 | 786,432 bytes | N/A (as above) |

The invention claimed is:

1. An image transmission method comprising:
inputting a pre-processed image;
automatically localizing at least one primary feature in the pre-processed image;
automatically determining a position within the pre-processed image of at least one landmark corresponding to the at least one primary feature;
automatically foveating the pre-processed image to emphasize portions of the pre-processed image within a pre-determined measure of closeness to the landmark(s); and
transmitting the foveated image to at least one recipient system, said recipient system reconstructing a received version of the pre-processed image by inverse foveation;
selecting numerical weights for each landmark;
adjusting the displacement according to an incompressible fluid flow model with the numerical weights applied as corresponding pressures at each landmark, said recipient system reconstructing the received version of the pre-processed image by computing an inverse of the fluid flow model;
in which;
the pre-processed image is one of a series of video image frames; and
the step of automatically foveating the pre-processed image comprises increasing a spatial sampling rate around the landmarks of interest.

2. The method of claim 1, comprising creating the foveated image independent of a point of gaze of a sending user.

3. The method of claim 1, further comprising determining the incompressible fluid flow model according to a Navier-Stokes equation.

4. The method of claim 1, further comprising rectifying the pre-processed image corresponding to a pre-determined image axis.

5. The method of claim 4, further comprising:
cropping the pre-processed image;
in which:
the primary feature is a human face,
the step of cropping the pre-processed image comprises isolating a portion of the pre-processed image that includes the face,
further comprising:
representing the isolated portion as a current vector of numerical elements;
comparing the current vector with pre-stored vectors representing other faces and, when the current vector has at least a threshold degree of similarity with any of the pre-stored vectors, tracking the human face across multiple video frames.

6. The method of claim 4, further comprising:
localizing the primary feature by applying a non-rigid similarity transform to the pre-processed image; and
rectifying the pre-processed image by applying a rigid transform.

7. The method of claim 1, further comprising automatically cropping the pre-processed image according to the landmark(s) before the step of automatic foveation.

8. The method of claim 1, in which the pre-processed image is created within the same device in which the steps of claim 1 are carried out.

9. An image presentation method comprising:
inputting from a compression system a foveated image, said foveated image having been created through automatic localization within a pre-processed image of at least one primary feature in the pre-processed image, automatic determination of a position within the pre-processed image of at least one landmark corresponding to the at least one primary feature, and automatic foveation of the pre-processed image to emphasize portions of the pre-processed image within a pre-determined measure of closeness to the landmark(s); and
reconstructing a received version of the pre-processed image by inverse foveation;
in which the inverse foveation step comprises adjusting the relative displacement between pixels of the foveated image by computing an inverse of an incompressible fluid flow model used to generate the foveated image from the pre-processed image by adjustment of pixel displacement, with numerical weights applied as corresponding pressures at each landmark.

10. The method of claim 9, in which the foveated image is one of a series of video image frames.

* * * * *